(12) United States Patent
Mirlay (10) Patent No.: US 9,891,420 B2
(45) Date of Patent: Feb. 13, 2018

(54) VARIABLE 3-DIMENSIONAL STEREOMICROSCOPE ASSEMBLY

(76) Inventor: Ram Srikanth Mirlay, Karnataka (IN)

(*) Notice: Subject to any disclaimer, the term of this patent is extended or adjusted under 35 U.S.C. 154(b) by 704 days.

(21) Appl. No.: 13/576,502

(22) PCT Filed: Mar. 7, 2011

(86) PCT No.: PCT/IN2011/000141
§ 371 (c)(1),
(2), (4) Date: Aug. 1, 2012

(87) PCT Pub. No.: WO2011/111061
PCT Pub. Date: Sep. 15, 2011

(65) Prior Publication Data
US 2012/0300292 A1    Nov. 29, 2012

(30) Foreign Application Priority Data

Mar. 10, 2010 (IN) .............................. 627/CHE/2010

(51) Int. Cl.
*G02B 21/22* (2006.01)
(52) U.S. Cl.
CPC .................................... *G02B 21/22* (2013.01)
(58) Field of Classification Search
CPC .... G02B 21/22; G02B 23/2415; G02B 27/22; G02B 27/225
USPC ......................................... 359/376–379, 381
See application file for complete search history.

(56) References Cited

U.S. PATENT DOCUMENTS 3,655,259 A    4/1972 Miyauchi et al.

FOREIGN PATENT DOCUMENTS

| DE | 102009014490 | * 10/2009 |
| EP | 0 776 576 B1 | 9/1998 |
| GB | 1175253 A | * 12/1969 |
| JP | 56-64312 | 6/1981 |
| JP | 57-62017 | 4/1982 |
| JP | 2003-215464 | 7/2003 |
| JP | 2006-284989 | 10/2006 |
| RU | 2128354 | 3/1999 |

* cited by examiner

*Primary Examiner* — Darryl J Collins
*Assistant Examiner* — Journey Sumlar
(74) *Attorney, Agent, or Firm* — Sughrue Mion, PLLC (57) ABSTRACT

The embodiments herein provide a variable three-dimensional stereomicroscope assembly. The assembly includes housing, an eye-piece optical unit provided with left and right eye pieces for viewing a target-object through left and right eyes respectively. A pair of movable and telescoping arms detachably coupled to the objective lens unit along with moveable sleeves for focusing a light reflected from the target object. Optics are provided to enable a desired binocular vision of the target-object through the left and right eye pieces simultaneously. The pair of movable and telescoping arms are individually moved and rotated to focus on the target-object. The stereomicroscope assembly includes mechanical and optical devices, and moveable arms, for varying the distance between the left and right optical path ways, by positioning the movable and telescoping arms at variable angular positions of convergence, for focusing on the target-object, and to increase or vary the degree of three-dimensional vision/depth-perception.

14 Claims, 5 Drawing Sheets

VARIABLE 3-DIMENSIONAL STEREOMICROSCOPE ASSEMBLY

TECHNICAL FIELD

The embodiments herein generally relate to a field of microscopes and particularly relates to stereomicroscopes. The embodiments herein more particularly relates to a stereomicroscope capable of providing 3-D vision or greater variable depth perception.

DESCRIPTION OF THE RELATED ART

Working with magnifying glasses and microscopes greatly limits a freedom of movement. With magnifying glasses, the distance from the object is fixed and in addition there is a very limited field of vision. Magnifying glasses, with their two-dimensional vision, are often low powered and not convenient. The presently available surgical microscopes have two eye pieces with variable adjustable inter pupillary distances (IPD). Normally, the adjustment of the IPD facilitates comfortable viewing with two eyes. These microscopes are referred to as stereomicroscopes.

The main difference between the conventional microscope and the stereomicroscope is that the conventional microscope observes the sample (i.e. target object) from a single direction, whereas the stereomicroscope observes the object from two significantly different angles, thereby providing the two distinctly differing images needed for the stereomicroscopic vision. The stereomicroscope gives a 3-D view of the object but the same object appears flat when it is viewed through a conventional microscope. This holds true even when the compound microscope has a binocular head because each eye sees almost the same image exactly due to a single objective lens system.

Stereomicroscopes are used to manipulate objects under visual observation and/or to make finer details of the objects more visible. The object of manipulation preferably takes place under low magnification and requires good 3-D reproduction. For detailed recognition, a rapid switching to the higher magnifications with higher resolution is desired without a change of instrument. The stereomicroscopes provide two views of the same object at various observation angles which are perceived by the viewer as a three dimensional image of the object.

However, the 3-D view is provided for a definite orientation of the sample. There is a certain disadvantage in viewing the same sample from different orientations without touching or re-orienting the sample. It is advantageous to have a stereomicroscope with an increased depth of perception and the field of vision. This will help to increase the precision in the work being performed. Hence, there is a need for a stereomicroscope with a variable inter-objective distance to provide an increased field and depth of vision.

In field of microscopy, the lateral separation between the nodal points of two objectives, generally, is referred to as the "stereo base separation". As is well understood by those skilled in the art, this separation distance corresponds to a maximum distance of about 26 mm. In case of known microscopes where a single objective is used (as shown in conventional microscope of FIG. 1), the stereo base separation will be the distance between left and right lenses, at the first point of incidence in from the objective, subsequent the passage of light beam from the objective. Accordingly, there is a limitation in varying the stereo base distance, beyond the distance of 26 mm, in known microscopes, physically, while maintaining the optical quality or avoiding optical distortion.

The above mentioned shortcomings, disadvantages and problems are addressed herein, which will be understood by reading the following specification.

OBJECTS OF THE EMBODIMENTS

A primary objective of the embodiments herein is to develop a variable 3-D stereomicroscope assembly with a variable inter-objective distance to provide an increased field and depth of vision.

Another objective of the embodiments herein is to develop a variable 3-D stereomicroscope assembly in which movable and telescoping arms work independently with each other to focus on the target object.

Yet another objective of the embodiments herein is to develop a variable 3-D stereomicroscope assembly with twin/two objectives for permitting light path to be perfectly and fully centered on the objectives for allowing an easy and efficient viewing of 3-D images of the target objects with greater depth of vision and with higher clarity of 3-D images.

Yet another objective of the embodiments herein is to develop a variable 3-D stereomicroscope assembly to provide 3-D view of the objects directly without using any computer program to process the visual data.

Yet another objective of the embodiments herein is to develop a variable 3-D stereomicroscope assembly to facilitate a convergence of the light rays to ensure a simultaneous locking of the views at different angles of the target.

Yet another objective of the embodiments herein is to develop a variable 3-D stereomicroscope assembly with non-parallel optic axes.

Yet another objective of the embodiments herein is to develop a variable 3-D stereomicroscope assembly in which the effective inter-objective optical distance is variable.

These and other objects and advantages of the embodiments herein will become readily apparent from the following detailed description taken in conjunction with the accompanying drawings.

SUMMARY

In the present invention, by using one or more movable arms, the stereo base is varied optically, without altering physically the stereo base distance. The various embodiments of the embodiments herein provide a three-dimensional stereomicroscope assembly. According to one embodiment of the embodiments herein, a variable 3-D stereomicroscope assembly has a housing. A left eye piece is assembled inside the housing for viewing a target object through a left eye. A right eye piece is assembled inside the housing for viewing the target object through a right eye. A pair of telescopic arms is detachably mounted on the housing through an opaque and movable sleeve. The sleeve may be a hard and rigid with a hinged connection or flexible. An objective lens unit is mounted above the pair of the telescopic arms for focusing a light reflected from the target object. A plurality of prisms is provided in the housing to enable a binocular vision through the left eye piece and the right eye piece simultaneously. The pair of telescopic arms are individually moved and rotated to focus on the target object. The objective lens unit includes a mechanical and optical device unit, which together with the moveable arms vary an inter-objective distance between a left optical path way and a right optical path way for focusing on the target object, and thereby vary what is commonly referred to in the art as the stereo base separation, to increase a degree of 3-D vision.

The assembly comprises a beam splitter and a zoom changer. The beam splitter is mounted below the left eye piece and the right eye piece for differentiating between a left eye piece lens pathway and a right eye piece lens pathway. The zoom changer is coupled to the beam splitter for focusing on the target object.

The objective lens unit has two objective lenses such as a left objective lens and a right objective lens mounted along an axis of the left eye piece and the right eye piece. The objective lens unit includes at-least one primary mirror positioned in such a manner that a plane of the mirror is normal to an optical axis of the objective lens.

The assembly sleeves allow a hinge movement for the pair of telescopic arms.

The pair of telescopic arms is positioned perpendicular and at variable oblique angles to an optic axis of each of the left objective lens and the right objective lens. The pair of telescopic arms is configured in such a manner that the pair of telescopic arms is moved independently. The pair of telescopic arms is configured in such a manner that the pair of telescopic arms is moved synchronously. The pair of telescopic arms is capable of executing oscillatory movement about a direction perpendicular to an axis A-A1 of the stereomicroscope.

The assembly further comprises at-least one focusing reflectors or mirrors or prisms mounted on an outermost section of each of the pair of telescopic arms along an orientation to reflect a beam received from the target object onto the left eye piece and the right eye piece and the orientation is same as that of the primary mirror.

The assembly further comprises a plane polarized filter mounted on a slot provided on the outermost section of each of the telescopic arms in the light path.

The primary mirrors, reflectors or prisms mounted on the telescopic arm are synchronously oriented with a tilt of the telescopic arm. The objective lens unit comprises an arrangement of a plurality of prisms and lenses for feeding the light rays from the target object into a left lens pathway and a right lens pathway.

The light rays from the target object travels through the left lens pathway and the right lens pathway before reaching the left eye piece and the right eye piece respectively. The left lens pathway and the right lens pathway which lead to the left eye piece and the right eye piece with an optical image are mounted very close to each other.

The pair telescopic arms are a right telescopic arm and a left telescopic arm. The right telescopic arm is mounted at a right side of the housing and the left telescopic arm is mounted at a left side of the housing. The pair of telescopic arms is made of a metal or a fiber optic material.

According to an embodiment herein, the variable 3-D stereomicroscope assembly comprises housing. A left eye piece is assembled inside the housing for viewing a target object through a left eye and a right eye piece is assembled inside the housing for viewing the target object through a right eye. A pair of telescopic arms is detachably mounted on the housing through movable sleeves. An objective lens unit is mounted within the housing above the pair of the telescopic arms for focusing a light reflected from the target object. A plurality of prisms is provided to enable a binocular vision through the left eye piece and the right eye piece simultaneously. The pair of telescopic arms are individually moved and rotated to focus on the target object. The objective lens unit includes a left objective lens and a right objective lens, which together with the movable arms, function to vary an inter-objective distance, optically, between a left optical path way and a right optical path way for focusing on the target object to increase a degree of 3-D vision or depth perception.

The variable 3-D stereomicroscope assembly further comprises a beam splitter mounted below the left eye piece and the right eye piece for differentiating between a left eye piece lens pathway and a right eye piece lens pathway. A zoom changer is coupled to the beam splitter for focusing on the target object.

The objective lens unit of the variable 3-D stereomicroscope includes a left objective lens and a right objective lens mounted along an axis of the left eye piece and the right eye piece. The objective lens unit includes at-least one primary mirror positioned such that a plane of the mirror is normal to an optic axis of the objective lens. The objective lens unit also comprises an arrangement of a plurality of prisms and lenses for feeding the light rays from the target object into a left lens pathway and a right lens pathway. The light rays from the target object travels through the left lens pathway and the right lens pathway before reaching the left eye piece and the right eye piece respectively. The left lens pathway and the right lens pathway which lead to the left eye piece and the right eye piece with an optical image are mounted very close to each other.

The telescoping arms of the variable 3-D stereomicroscope assembly include movable sleeves which allow a hinge movement for the pair of telescopic arms. The pair of telescopic arms comprises a right telescopic arm and a left telescopic arm. The right telescopic arm is mounted at a right side of the housing and the left telescopic arm is mounted at a left side of the housing. The pair of telescopic arms is made of a metal tube or a rigid tube or a fiber optic device.

The pair of telescopic arms is positioned perpendicular to an optic axis of each of the left objective lens and the right objective lens and configured in such a manner that the pair of telescopic arms can be moved independently as well as synchronously. The pair of telescopic arms are capable of executing oscillatory movement about a direction perpendicular to an axis A-A1 of the stereomicroscope. A polarized filter is mounted on a slot provided on the outermost section of each of the telescopic arms.

The variable 3-D stereomicroscope assembly further comprises at-least one focusing mirror mounted on an outermost section of each of the pair of telescopic arms along an orientation to reflect a beam received from the target object onto the left eye piece and the right eye piece and wherein the orientation is same as that of the primary mirror. The mirror mounted on the telescopic arm is synchronously oriented with a tilt of the telescopic arm.

According to one embodiment herein, a single telescopic arm is mounted on the objective lens unit. At-least one of the light paths is allowed to pass through the telescopic arm and the other light path passes directly through the other objective lens. Hence the single telescopic arm alone is capable of providing a 3-D vision of the target object along with the respective objective lenses.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiments herein and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The variable 3-D stereomicroscope assembly further comprises a beam splitter mounted below the left eye piece and the right eye piece for differentiating between a left eye piece lens pathway/optical axis and a right eye piece lens pathway/optical axis. A zoom changer is coupled to the beam splitter for focusing on the target object.

The objective lens unit of the variable 3-D stereomicroscope includes a left objective lens and a right objective lens mounted respectively along an axis of the left eye piece and the right eye piece. The objective lens unit includes at-least one primary mirror positioned such that a plane of the mirror is normal to an optic axis of the objective lens. The objective lens unit also comprises an arrangement of a plurality of prisms and lenses for feeding the light rays from the target object into a left lens pathway and a right lens pathway. The light rays from the target object travels through the left lens pathway and the right lens pathway before reaching the left eye piece and the right eye piece respectively. The left lens pathway and the right lens pathway which lead to the left eye piece and the right eye piece with an optical image are mounted very close to each other.

The telescoping arms of the variable 3-D stereomicroscope assembly include movable sleeves to allow a hinge movement for the pair of telescopic arms. The pair of telescopic arms includes a right telescopic arm and a left telescopic arm. The right telescopic arm is mounted at a right side of the housing and the left telescopic arm is mounted at a left side of the housing. The pair of telescopic arms is made of a metal or a fiber optic material.

The pair of telescopic arms is positioned perpendicular and at variable oblique angles to an optic axis of each of the left objective lens and the right objective lens and configured in such a manner that the pair of telescopic arms can be moved independently as well as synchronously. The pair of telescopic arms is capable of executing oscillatory movement about a direction perpendicular to an axis A-A1 of the stereomicroscope. A polarized filter is mounted on a slot provided on the outermost section of each of the telescopic arms.

The variable 3-D stereomicroscope assembly further comprises at-least one focusing mirror or prisms mounted on an outermost section of each of the pair of telescopic arms along an orientation to reflect a beam received from the target object onto the left eye piece and the right eye piece and the orientation is same as that of the primary mirror. The mirrors and/or prisms mounted on the telescopic arm are synchronously oriented with a tilt of the telescopic arm.

According to one embodiment herein, a single telescopic arm alone is capable of providing a 3-D vision of the target object.

Figure 1:
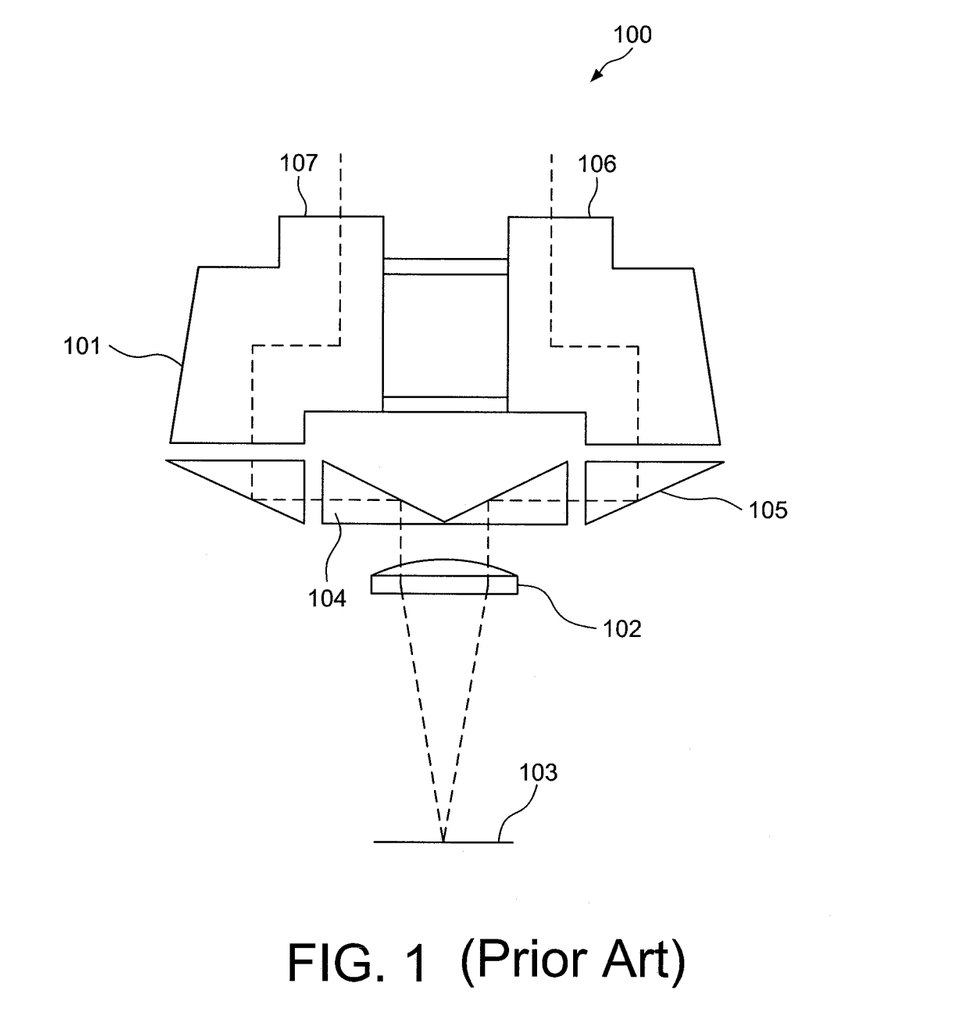
FIG. 1 illustrates a cross sectional view of a conventional stereomicroscope.

FIG. 1 illustrates the cross sectional line diagram of a conventional stereomicroscope. The stereomicroscope 100 comprises a housing 101, a single objective lens 102 provided for focusing the light reflected from a target object 103 onto a plurality of prisms 104 and 105, through separate paths to enable a binocular vision through an eye pieces 106 and 107 mounted on the housing 101. The single objective 102 feeds the light into a two separate paths comprising of an arrangement of plurality of prisms and lenses 104 and 105. The two separate paths referred to hereinafter as lens pathways (LP). The light reflecting from the target object 103 is directed towards the objective 102. Further, the light travels through the left lens pathway 106 and the right lens pathway 107 before reaching the corresponding left eye piece and the right eye piece. However, the inter lens pathway distance of the stereomicroscope described herein above is limited and fixed. The left lens pathway and the right lens pathway, which lead to the left eye piece and the right eye piece with optical images, are very close to each other, with a distance in the range between 22 millimeters to 28 millimeters. The image thus formed by the conventional stereomicroscope is fixed and has a predefined depth of vision. The restricted image formation and the resulting depth of vision are advantageously overcome in the 3D stereomicroscope, embodiments of which shall be briefly described herein below.

Figure 2:
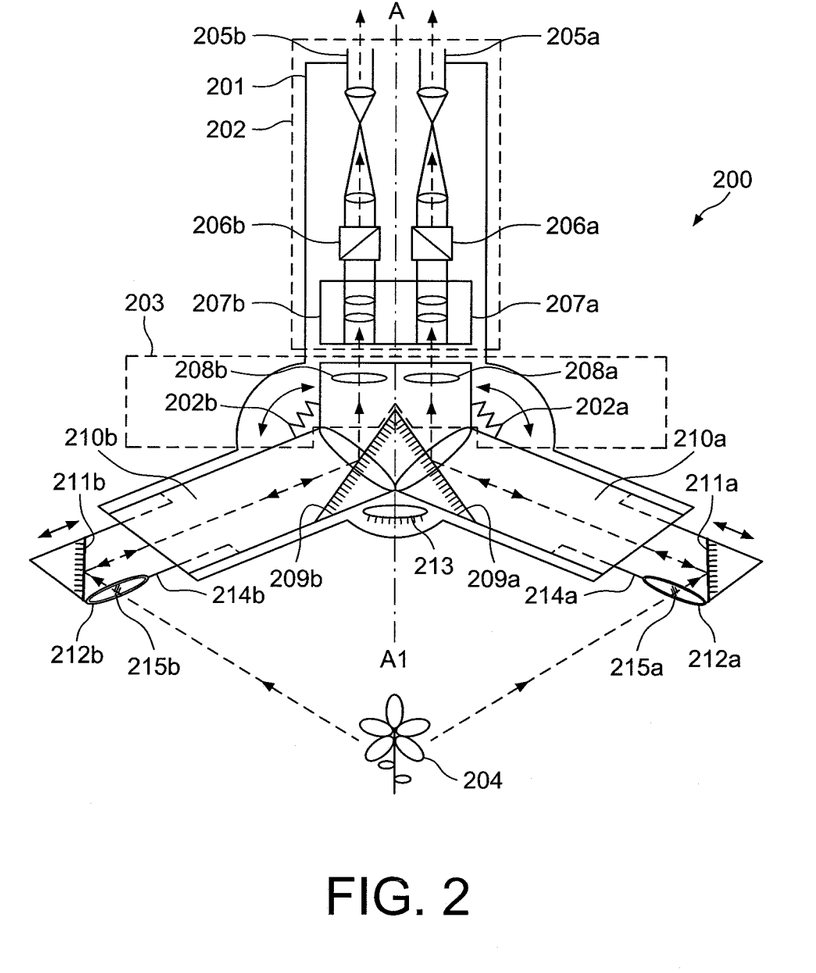
FIG. 2 illustrates a vertical cross sectional view of a 3D stereomicroscope assembly of the present invention with a pair of movable and telescoping arms, according to one embodiment herein.

FIG. 2 illustrates a vertical cross sectional view of the 3D stereomicroscope assembly, according to one embodiment herein. The 3D stereomicroscope 200 comprises a housing 201, an eye piece unit 202 and an objective unit 203. The eye piece unit 202 includes a left eye piece 205b assembled inside the housing 201 for left eye viewing of a target object 204 and a right eye piece 205a assembled inside the housing 201 for right eye viewing of a target object 204. The eye pieces 205b and 205a having respective optical axes, are arranged in plane parallel to the axis A-A1 of the three-dimensional stereomicroscope assembly, as shown in FIG. 2. A beam splitter arrangement 206 is mounted below the left eye piece 205b and the right eye piece 205a. The beam splitter arrangement includes a left beam splitter 206b and a right beam splitter 206a. A left zoom changer 207b and a right zoom changer 207a are operably coupled to the left and right beam splitters 206b, 206a. The objective unit 203 includes a pair of objectives such as a left objective 208b and a right objective 208a mounted along the axis of the left eye piece 205b and the right eye piece 205a and the objectives 208a, 208b are positioned independent of each other.

At each of the left objective 208b and the right objective 208a, at-least one primary mirror 209b for the left objective 208b and another primary mirror 209a for the right objective 208a are positioned such that the plane of the mirrors 209b, 209a are normal to the optic axis of the left objective 208b and the right objective 208a. A pair of telescoping arms comprising a left telescoping arm 210b and a right telescoping arm 210a which are substantially perpendicular to the optic axis of each of the left objective 208b and the right objective 208a is provided. At-least one focusing mirror 211 is mounted on the outermost section of each of the telescoping arms 210, along the same orientation as that of the primary mirrors 209a, 209b to reflect the beam received from the target object 204 onto the left eye piece 202b and the right eye piece 202a. An illumination source 213 is provided below the telescoping arms or arranged co-axially with the optical axis of the microscope. Plain polarized filter 212b and 212a are mounted on a slot provided on the outermost section of each of the telescoping arms 210.

Figure 3:
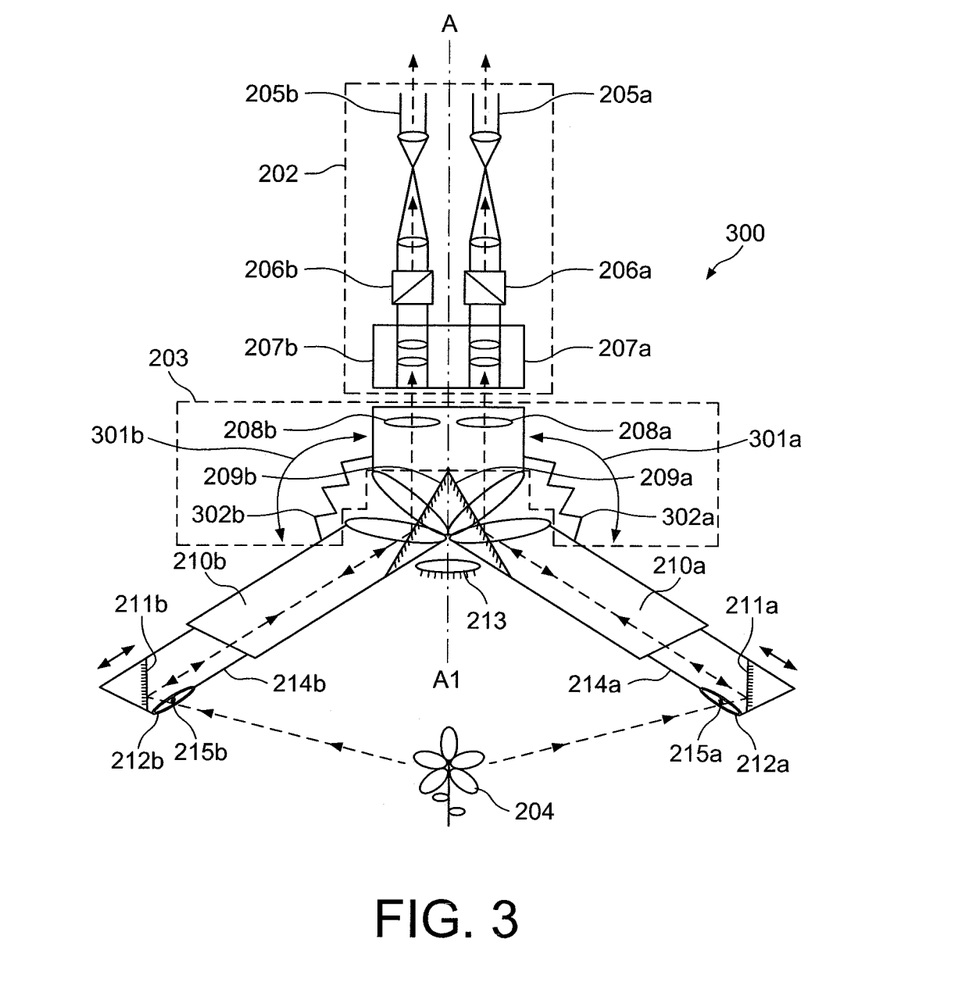
FIG. 3 illustrates a cross sectional view of a 3D stereomicroscope assembly of the present invention showing the hinge movement of the telescoping arms, according to one embodiment herein.

FIG. 3 illustrates the cross sectional view of a variable 3-D stereomicroscope assembly showing the hinge movement of the telescoping arms 210b and 210a, according to one embodiment herein. The telescoping arms includes the left telescoping arm 210b and the right telescoping arm 210a which are detachably mounted to the objective unit. The telescoping arms 210a, 210b are configured for executing independent movements and alternatively, the left telescoping arm 210b and the right telescoping arm 210a are configured for synchronous movement. Further, the telescoping arms 210a, 210b are capable of executing oscillatory movement about a direction perpendicular to the axis of the stereomicroscope A-A1 as shown in FIG. 3. The mirrors 209a, 209b mounted on the telescoping arms 210a, 210b are capable of orienting synchronously with the tilt of the telescoping arms 210a, 210b. In other words, the movable and telescoping arms 210b and 210a are provided with variable target-object convergence positions, as shown in FIG. 3, to focus on the target-object 204, from various angular positions, to provide a variable 3-D vision or a greater depth-perception of the target-object 204. The variable target-object convergence positions are at oblique angles and/or substantially perpendicular to the axis A-A1 of the stereomicroscope assembly. Each of the left telescoping arm 210b and the right telescoping arm 210a are connected to the objectives 203b, 203a through flexible sleeves 302b and 302a. These flexible sleeves 302a, 302b allow a hinge movement of the telescoping arms 210a, 210b.

Figure 4:
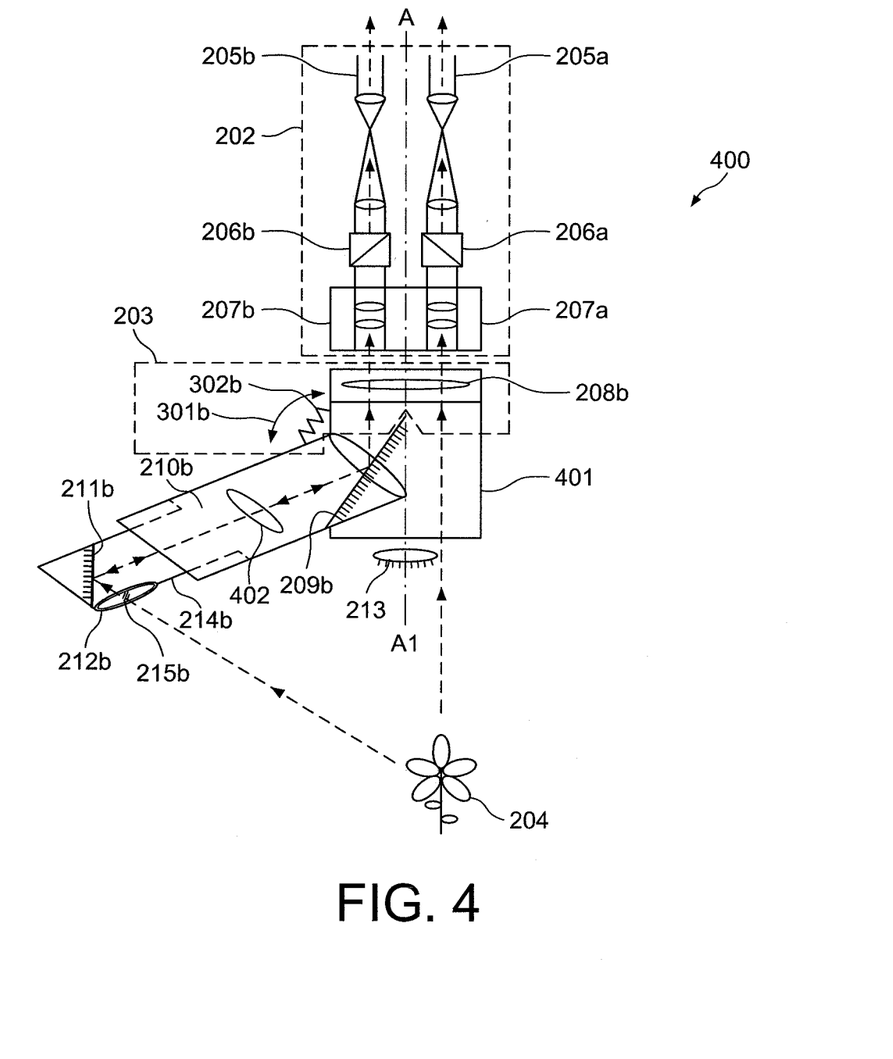
FIG. 4 illustrates a cross sectional view of a 3D stereomicroscope assembly of the present invention showing an arrangement with single movable and telescoping arm, according to one embodiment herein.

FIG. 4 illustrates a cross sectional view of a variable 3-D stereomicroscope assembly showing a detachable adaptor unit 401 with one telescoping arm, according to one embodiment herein. The 3D stereomicroscope 200 comprises a housing 201, an eye piece unit 202 and an objective lens unit 203. The eye piece unit 202 includes a left eye piece 205b assembled inside the housing 201 for left eye viewing of a target object 204 and a right eye piece 205a assembled inside the housing 201 for right eye viewing of a target object 204 as shown in FIG. 2. A detachable adaptor 401 is provided as shown in FIG. 4. The adaptor 401 is detachable and can be mounted on any single objective microscopes available in the market. A corrective lens 402 is adopted inside the left telescoping arm 210b. A beam splitter arrangement 206 is mounted below the left eye piece 205b and the right eye piece 205a. The beam splitter arrangement includes a left beam splitter 206b and a right beam splitter 206a. A left zoom changer 207b and a right zoom changer 207a are operably coupled to the left and right beam splitters 206b, 206a. The objective unit 203 includes a left objective 208b mounted along the axis of the left eye piece 205b. A left telescopic arm 210b is mounted on the adaptor with the flexible sleeves 302b. The left telescopic arm 210b can be adjusted to focus on the target object 204 for a greater degree of the 3-D vision or the depth perception.

At the left objective 208b, at-least one primary mirror 209b is positioned such that the plane of the mirror 209b is normal to the optic axis of the left objective 208b. The left telescoping arm 210b is substantially perpendicular to the optic axis of the left objective 208b. At-least one focusing mirror 211 is mounted on the outermost section of the left telescoping arms 210b, along the same orientation as that of the primary mirrors 209b to reflect the beam received from the target object 204 onto the left eye piece 202b. An illumination source 213 is provided below the telescoping arms or arranged co-axially with the optical axis of the microscope A plane polarized filter 212b is mounted on a slot provided on the outermost section of the left telescoping arms 210b. The right light path from the target object 204 is directly viewed from the right eye piece 205a after the light rays passes through the right zoom changer 207a and the right beam splitters 206b.

Figure 5:
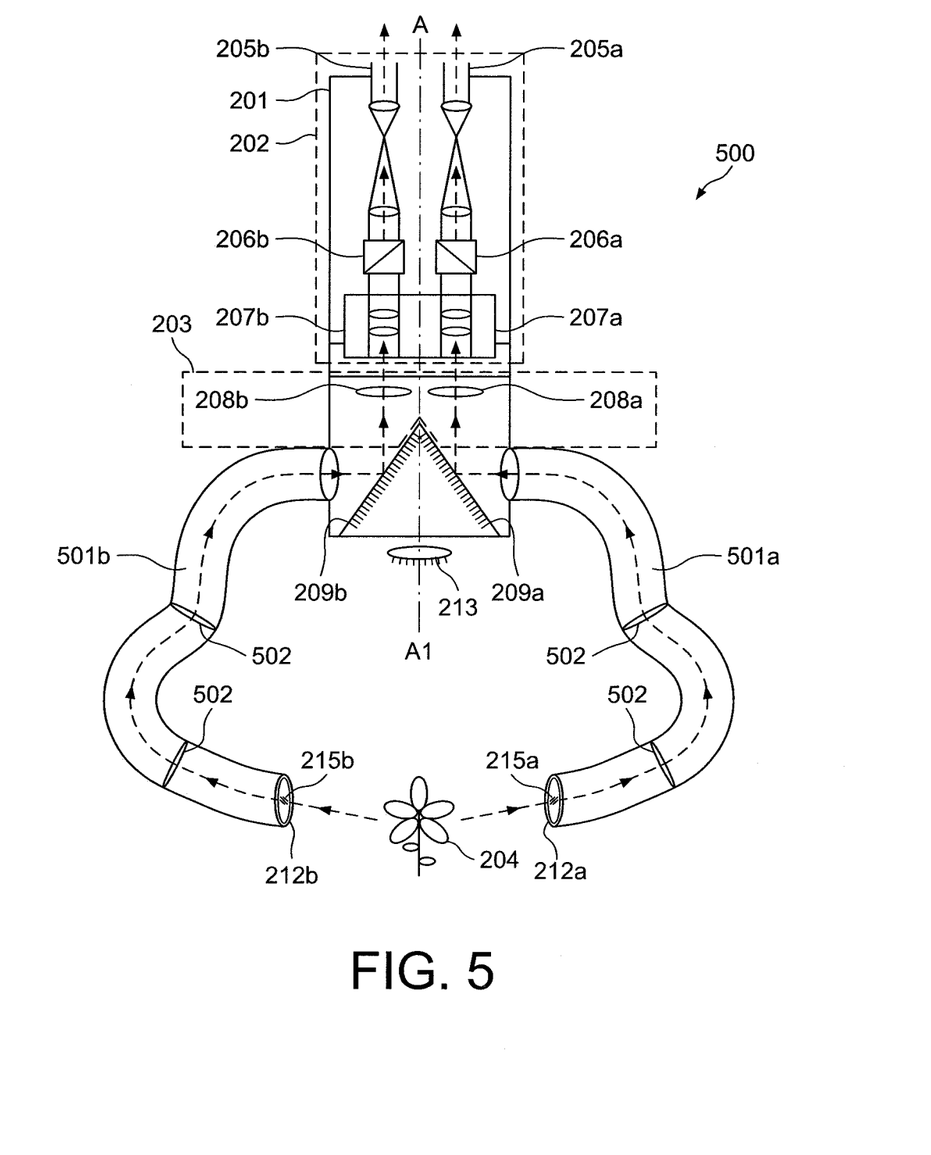
FIG. 5 illustrates a cross sectional view of a 3D stereomicroscope assembly of the present invention, with movable and flexible fiber optic arms, according to one embodiment herein.

FIG. 5 illustrates a cross sectional view of a variable 3-D stereomicroscope assembly with a flexible fiber optic arms 501a and 501b, according to one embodiment herein. The variable 3-D stereomicroscope 200 comprises a housing 201 which includes an eye piece unit and an objective unit. The eye piece unit includes a left eye piece 205b assembled inside the housing 201 for left eye viewing of a target object 204 and a right eye piece 205a assembled inside the housing 201 for right eye viewing of a target object 204. A beam splitter arrangement 206 is mounted below the left eye piece 205b and the right eye piece 205a. The beam splitter arrangement includes a left beam splitter 206b and a right beam splitter 206a. A left zoom changer 207b and a right zoom changer 207a are operably coupled to the left and right beam splitters 206b, 206a. The objective unit includes a pair of objective lenses such as a left objective 208b and a right objective 208a mounted along the axis of the left eye piece 205b and the right eye piece 205a and the objective lenses 208a, 208b are positioned independent of each other.

At each of the left objective 208b and the right objective 208a, at-least one primary mirror 209b for the left objective 208b and another primary mirror 209a for the right objective 208a is positioned such that the planes of the mirrors 209b, 209a are normal to the optic axis of the left objective 208b and the right objective 208a. Pair of flexible fiber optic arms comprising a left fiber optic arm 210b and a right fiber optic arm 210a which are substantially perpendicular to the optic axis of each of the left objective 208b and the right objective 208a are provided. An illumination source 213 is provided below the telescoping arms 501a and 501b. Plane polarized filters 212b and 212a are mounted on a slot provided on the outermost section of each of the left fiber optic arm 210b and right fiber optic arm 210a respectively.

The inter-objective distance of the variable 3-D stereomicroscope 200 is varied by having a mechanical and an optical device in the objectives of the housing of the stereomicroscope 200 to allow the variable 3-D stereomicroscope 200 to focus on the target object 204 with a greater degree of the 3-D vision.

According to one embodiment herein, the variable 3-D stereomicroscope assembly enables to adjust the degree of convergence to the minimum of 10 degrees to the maximum of 120 degrees of the objectives to vary the inter-optical distance to enhance the 3-D effect or depth perception.

Thus the various embodiments of the variable 3-D stereomicroscope assembly enable to adjust the degree of convergence to a desired level and to vary the inter-optical distance of the left and right incident light beams easily, efficiently and accurately to enhance the 3-D effect or depth perception.

The variable 3-D stereomicroscope of the embodiments herein allows to view the three dimensional image of a target object directly, as no computer system is present to process the visual data. The two image viewing devices of the variable 3-D stereomicroscope work separately and independently from each other providing ease of operation. The variable 3-D stereomicroscope has a design which incorporates convergence to ensure simultaneous locking of the different views of the target. The variable 3-D stereomicroscope of the embodiments herein having twin/two objectives permits each light path to be perfectly and fully centered on the objective and allows an easy and efficient viewing of 3-D images of different objects. It is possible to control (increase or decrease) the degree of depth perception or 3-D by simply increasing or decreasing the angle of convergence. The stereomicroscope of the embodiments herein has immense practical applications in many industrial and medical or surgical or other areas. The variable 3-D stereomicroscope of the embodiments herein offers increased depth of the perception of the target object and offers increased field of vision. This will make industrial or medical or laboratory operations easier and safer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A stereomicroscope assembly to optically view a variable three-dimensional image of a target-object, comprising:
   an eye-piece optical unit including eye pieces spaced apart and having respective optical axes;
   an objective lens unit including a pair of objective lenses, each objective lens having an optical axis aligned with a respective one of the optical axes of the eye pieces; and
   a pair of movable arms with flexible sleeves connected to the objective lens unit, each arm being adjustable to focus on the target-object;
   wherein each of the movable arms are adjustable to vary target-object convergence positions of the beams received from the target-object, and thereby optically vary the stereo base separation and to direct the beams received from the target-object to a respective corresponding one of the pair of objective lenses and each of the pair of objective lenses directs the beams received from the corresponding movable arm to a respective corresponding one of the eye pieces.

2. A stereomicroscope assembly according to claim 1, wherein:
   the arms are adjustable to vary target-object convergence positions from a minimum of 10 degrees to a maximum of 120 degrees.

3. The stereomicroscope assembly according to claim 1, wherein:
   the pair of arms are adjustable either synchronously or asynchronous.

4. The stereomicroscope assembly according to claim 1, wherein:
   each of the pair of arms includes at least one of a lens, mirror, and a polarized filter.

5. The stereomicroscope assembly according to claim 1, wherein:
   each of the pair of arms is capable of telescopic movement.

6. The stereomicroscope assembly according to claim 1, wherein:
   each of the pair of arms is formed of flexible fiber optic cable.

7. The stereomicroscope assembly according to claim 1, wherein:
   each of the pair of arms is positioned at variable oblique angles to the optical axis of the corresponding objective lens and is moveable so as to oscillate about a direction perpendicular to an axis of the stereomicroscope; and
   the axis of the stereomicroscope is substantially parallel to the optical axes of the pair of objective lenses.

8. A stereomicroscope assembly to optically view a variable three-dimensional image of a target-object, comprising:
   an eye-piece optical unit including eye pieces spaced apart and having respective optical axes;
   an objective lens unit including an objective lens having a first optical axis aligned with the optical axis of a corresponding one of the eye pieces and a second optical axis aligned with the optical axis a corresponding other of the eye pieces; and
   a movable arm with a flexible sleeve connected to the objective lens unit, and being adjustable to focus on the target-object;
   wherein the moveable arm is adjustable to vary target-object convergence positions of the beams received from the target-object by the arm and directly by the objective lens, and thereby optically vary the stereo base separation, the movable arm is configured to direct a beam received from the target-object to the objective lens along the first optical axis and the objective lens is configured to direct the beam received from the movable arm to the corresponding eye piece;

wherein the objective lens is configured so as to be capable of focusing on the target-object, receiving a beam directly from the target-object along the second optical axis and directing the beam to the corresponding eye piece.

9. A stereomicroscope assembly according to claim 8, wherein:

the arm is adjustable to vary target-object convergence positions from a minimum of 10 degrees to a maximum of 120 degrees.

10. The stereomicroscope assembly according to claim 8, wherein:

the arm includes at least one of a corrective lens, a mirror, and a polarized filter.

11. The stereomicroscope assembly according to claim 8, wherein:

the arm is capable of telescopic movement.

12. The stereomicroscope assembly according to claim 8, wherein:

the arm is formed of flexible fiber optic cable.

13. The stereomicroscope assembly according to claim 8, wherein:

the arm is positioned at variable oblique angles to the optical axis of the corresponding objective lens and is moveable so as to oscillate about a direction perpendicular to an axis of the stereomicroscope; and the axis of the stereomicroscope is substantially parallel to the optical axes of the objective lens.

14. A stereomicroscope assembly to optically view a variable three-dimensional image of a target-object, comprising:

an eye-piece optical unit including eye pieces spaced apart and having respective optical axes;

an objective lens unit including one or more objective lenses, each of the one or more objective lenses having an optical axis aligned with an optical axis of one of the eye pieces; and one or more movable arms are adjustable to vary target-object convergence positions of the beams received from the target-object, and thereby optically vary the stereo base separation, the one or more movable arms with flexible sleeves are connected to the objective lens unit, each arm being adjustable to focus on the target-object;

wherein each movable arm is configured to direct a beam received from the target-object to the one or more objective lenses and each objective lens is configured to direct the beam received from each movable arm to the eye pieces.

* * * * *